United States Patent
Dittmar et al.

(10) Patent No.: US 8,734,022 B2
(45) Date of Patent: May 27, 2014

(54) SEALING DEVICE FOR A HUB AND A BEARING ASSEMBLY INCLUDING THE SEALING DEVICE

(75) Inventors: Rico Dittmar, Schweinfurt (DE); Thilo Beck, Werneck (DE); Bernd Stephan, Schweinfurt (DE); Arno Stubenrauch, Aidhausen (DE); Peter Volpert, Bergrheinfeld (DE); Thomas Will, Poppenhausen (DE); John M. Dominguez, Elgin, IL (US); Linas L. Maskaliunas, Geneva, IL (US)

(73) Assignee: Aktiebolaget SKF, Gothenburg (SE)

( * ) Notice: Subject to any disclaimer, the term of this patent is extended or adjusted under 35 U.S.C. 154(b) by 554 days.

(21) Appl. No.: 12/764,743

(22) Filed: Apr. 21, 2010

(65) Prior Publication Data
US 2011/0262063 A1  Oct. 27, 2011

(51) Int. Cl.
*F16C 33/76* (2006.01)
*F16C 33/80* (2006.01)

(52) U.S. Cl.
USPC ............................................. 384/486; 384/480

(58) Field of Classification Search
CPC . F16C 33/7886; F16C 3/7896; F16C 33/7826
USPC ............... 384/477, 478, 480, 484, 486, 589; 277/549, 551, 571, 572–577
See application file for complete search history.

(56) References Cited

U.S. PATENT DOCUMENTS

| | | | |
|---|---|---|---|
| 5,135,236 A * | 8/1992 | Kruk | 277/572 |
| 7,594,664 B2 * | 9/2009 | Maskaliunas | 277/551 |
| 2007/0024273 A1 * | 2/2007 | Kobayashi | 324/174 |
| 2007/0222161 A1 * | 9/2007 | Voydatch et al. | 277/551 |

FOREIGN PATENT DOCUMENTS

DE  1981048 U  *  3/1968

OTHER PUBLICATIONS

Machine translation of DE1981048, provided by the EPO, retrieved Nov. 13, 2012.*

* cited by examiner

*Primary Examiner* — Thomas R Hannon
(74) *Attorney, Agent, or Firm* — Bryan Peckjian; SKF USA Inc. Legal Department

(57) ABSTRACT

A sealing device is provided for sealing a space between a hub and a spindle pivotally connected by a bearing, the hub being coaxially mounted on the spindle and extending in an axial direction and the bearing having an inner ring. The sealing device includes a radial shaft seal including a shell portion having an outer static sealing surface disposeable against the hub and a hinge portion having a radial sealing lip. A sleeve member includes an inner static sealing surface disposeable against the spindle, a running surface contactable by the sealing lip and a sleeve portion. The sleeve portion extends in the axial direction beyond a side surface of the bearing inner ring and is disposeable about a shoulder diameter of the bearing inner ring.

17 Claims, 2 Drawing Sheets

SEALING DEVICE FOR A HUB AND A BEARING ASSEMBLY INCLUDING THE SEALING DEVICE

The present invention relates to a sealing device for a hub, and to a bearing assembly comprising such a sealing device. In particular, the present invention relates to a sealing device for sealing a rolling bearing assembly against dust and dirt, and to prevent leakage of bearing fluids, for instance, oil or grease.

Conventional inboard dirt seals are first mounted in the wheel hub and then are mounted, together with the wheel hub, on the spindle. During mounting of the wheel hub onto the spindle, the seal may easily misalign because the sleeve is not guided. A misaligned seal, however, can cause oil leakage as well as dirt or water ingress potentially resulting in premature seal or bearing failure.

SUMMARY OF THE INVENTION

It is an object of the present invention to provide a sealing device for a hub having improved sealing capabilities, particularly reducing the risk of oil leakage and dirt or water ingress.

The object is achieved in accordance with the invention by means of a sealing device for a hub which is coaxially mounted on a spindle and extends in an axial direction. The sealing device comprises a radial shaft seal comprised of a shell portion including an outer static sealing surface for the hub and a hinge portion including a radial sealing lip, and a sleeve member which comprises an inner static sealing surface for the spindle and a running surface for the sealing lip. The sleeve member comprises a sleeve portion which extends in the axial direction in order to extend beyond a side surface and to surround a shoulder diameter of an inner ring of a rolling bearing for mounting on the spindle.

The inventive sleeve member provides a connection with the rolling bearing, particularly with its inner ring. This connection may be a press fit connection. For assembling, the rolling bearing may first be pressed into the hub and then the radial shaft seal may be pressed into the hub and the sleeve member onto the inner ring of the rolling bearing.

The sleeve portion of the sleeve member may ensure a coaxial alignment of the sleeve member with respect to the rolling bearing. Assuming that the rolling bearing and the radial shaft seal are sufficiently aligned coaxially, the sleeve member may sufficiently be aligned with the radial shaft seal.

A stiff arrangement of the radial shaft seal and the rolling bearing unit may result in minimised damages during mounting and misalignments of the sleeve member. The sleeve member may be positioned to the seal lips in a relatively well manner, if not even positioned optimally, potentially resulting in an optimal running and sealing performance which may reduce friction and wear.

The dimensions of conventionally used rolling bearing and seats on the hub and spindle may not need to be significantly modified. Therefore, existing bearing assembly solutions may still be used utilizing the inventive sealing device. In some cases it may only be necessary to replace a conventional sleeve member by the inventive sleeve member. It is possible to design the sleeve and hub to have optimal or near optimal sealing function.

The radial lip of the radial shaft seal provides the main sealing function. Inner diameter beads and outer diameter beads provide static seals.

Already used conventional seal devices may be replaced by the inventive sleeve member. The inventive sleeve member can also be mounted on conventional spindles. The inventive sleeve member can be produced in a cost effective manner, because it is possible to use most of the existing components and/or tools.

The inventive sealing device may comprise a sleeve portion which comprises an inner diameter corresponding to the shoulder diameter of the inner ring in order to enable a rigid press fit connection between the sleeve member and the inner ring of the rolling bearing.

The inventive sealing device may comprise a sleeve member which is comprised of an inner radial step, in order to restrict the maximum width of an axial overlap of the sleeve portion and the inner ring of the rolling bearing. The inner radial step may be provided with a radial extending side face which faces to the side face of the inner ring of the rolling bearing. The inner radial step of the sleeve member may be a rubber end stop of an inner static sealing surface of the sleeve member. Thus, the width of an axial overlap of the sleeve portion and the inner ring of the rolling bearing is restricted to a maximum width where the inner radial step of the sleeve member meets the side face of the inner ring.

The inventive sealing device may comprise a sleeve member which is comprised of a tapered passage to enable an alignment of the sleeve member relative to the spindle while mounting the sleeve member on the spindle. The tapered passage of the sleeve member may be a guiding chamfer at a side face of an inner static sealing surface of the sleeve member.

The inventive sealing device may comprise a curl portion provided at a rim of the sleeve member adjacent to the inner ring of the rolling bearing. The curl portion of the sleeve member may provide additional stiffness at the press fit connection of the sleeve member and the inner ring of the rolling bearing at the sleeve portion. The curl of the sleeve member may avoid that the seal unit comprised of the radial shaft seal and the sleeve member falls apart, for instance, during shipment or mounting.

In a restricted version of the inventive sealing device, the curl may comprise an outer diameter which extends beyond the inner diameter of the radial sealing lip of the radial shaft seal.

In one embodiment of the inventive sealing device, the sealing device may comprise an annular washer portion at the sleeve member extending in a radial direction to provide a gap seal with the hub.

The sleeve member shape may form an axial and radial gap or a labyrinth with the hub, in order to protect the radial shaft seal, for instance, against dirt, dust or spraying water. The sleeve member and the hub may be formed such that water entered between the radial shaft seal and the sleeve member may easily flow out. The sleeve member and the hub may form a parallel gap in order to remove, for instance, dirt, dust and water by means of centrifugal forces.

In another embodiment of the inventive sealing device, the sealing device may comprise an annular washer comprising an annular washer portion which is stepped in order to provide a labyrinth seal with the hub. Such a labyrinth design may minimise dirt and/or dust entering the seal. This may be realized without the need of additional lip contacts, avoiding additional friction within the bearing arrangement.

In another embodiment of the inventive sealing device, the radial shaft seal may comprise a stop end at a side face of the shell portion, in order to abut on the outer ring side face in a mounting position. Thus, a defined axial position of the radial shaft seal relating to the outer ring of the rolling bearing and the hub may be achieved.

Another aspect of the invention is directed to a bearing assembly comprises a rolling bearing, which includes an outer ring, an inner ring and a radial shaft seal with a shell portion including an outer static sealing surface and a hinge portion including a radial sealing lip further comprising a hub with a hub bore with a first seat for the outer ring of the rolling bearing and a second seat for the outer static sealing surface of the radial shaft seal and further comprising a sleeve member with an inner static sealing surface and a running surface for the radial sealing lip. A spindle comprises a first seat for the inner ring of the rolling bearing and a second seat for the inner static sealing surface of the sleeve member. The spindle extends in an axial direction coaxially with the hub. The sleeve member being mounted on the second seat of the spindle and comprising a sleeve portion extending in the axial direction beyond a side surface and surrounding a shoulder diameter of the inner ring of the rolling bearing mounted on the first seat of the spindle.

The inventive bearing assembly may comprise a sleeve portion which is rigidly press fitted to the inner ring of the rolling bearing.

The bearing assembly may further comprise a curl portion provided at a rim of the sleeve member adjacent to the inner ring of the rolling bearing.

In a restricted version of the inventive bearing assembly, the curl portion may comprise an outer diameter extending beyond the inner diameter of the radial sealing lip of the radial shaft seal.

In one embodiment of the inventive bearing assembly, the bearing assembly may further comprise an annular washer portion at the sleeve member extending in a radial direction in order to provide a gap seal with the hub.

In another embodiment of the bearing assembly, the annular washer portion may be stepped to provide a labyrinth seal with the hub.

In certain constructions of the inventive bearing assembly, the hub may include a stepped labyrinth sealing portion having a sealing surface arranged in parallel and in a distance to a labyrinth sealing surface of the annular washer portion of the sleeve member.

Also, in certain constructions, the sealing surface of the stepped labyrinth sealing portion of the hub and the labyrinth sealing surface of the annular washer portion of the sleeve member may form an axial gap and a radial gap of the labyrinth seal.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
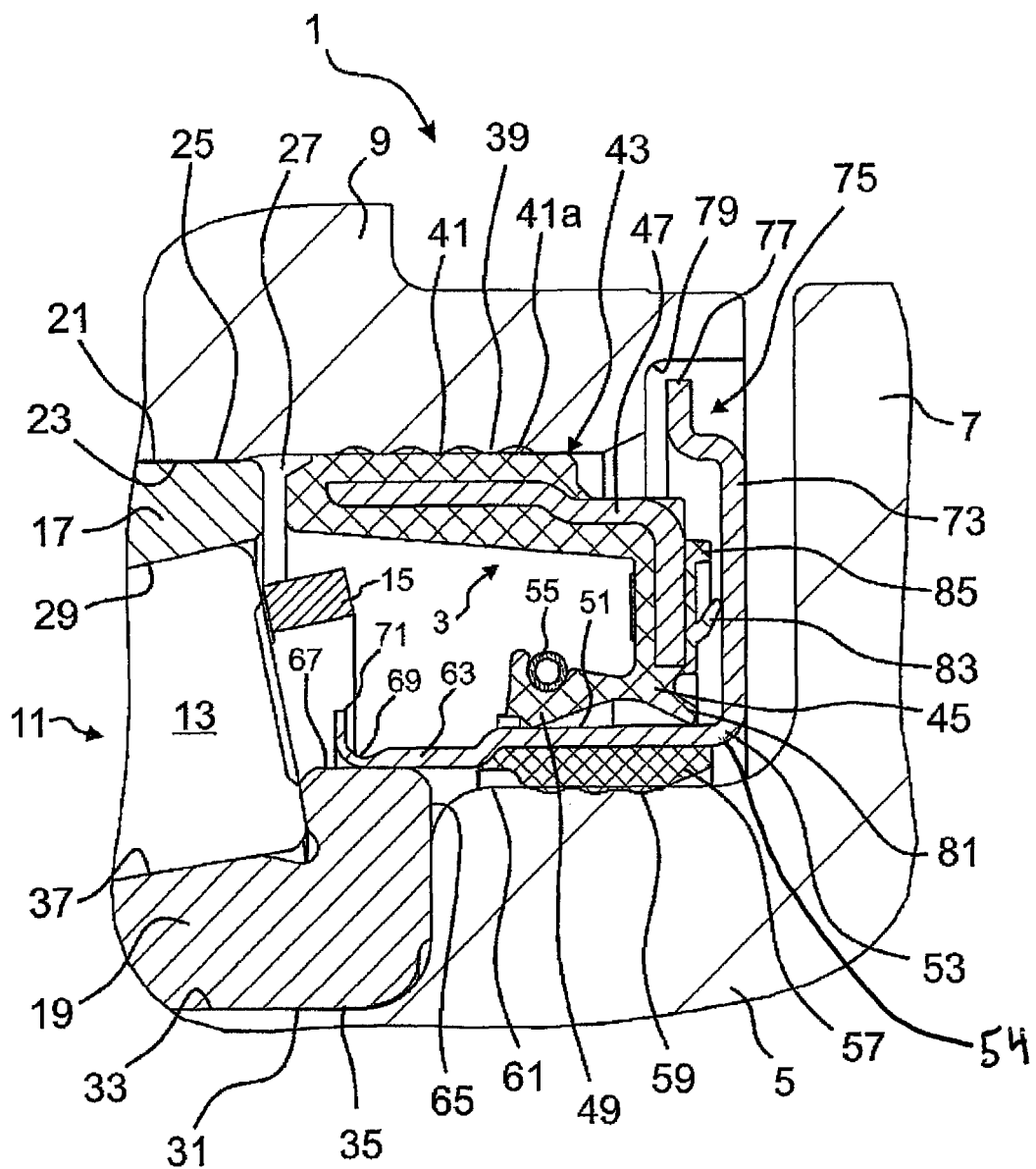
FIG. 1 is a cross-sectional side view of an illustrative embodiment of one inventive bearing assembly comprising an inventive sealing device.
Figure 2:
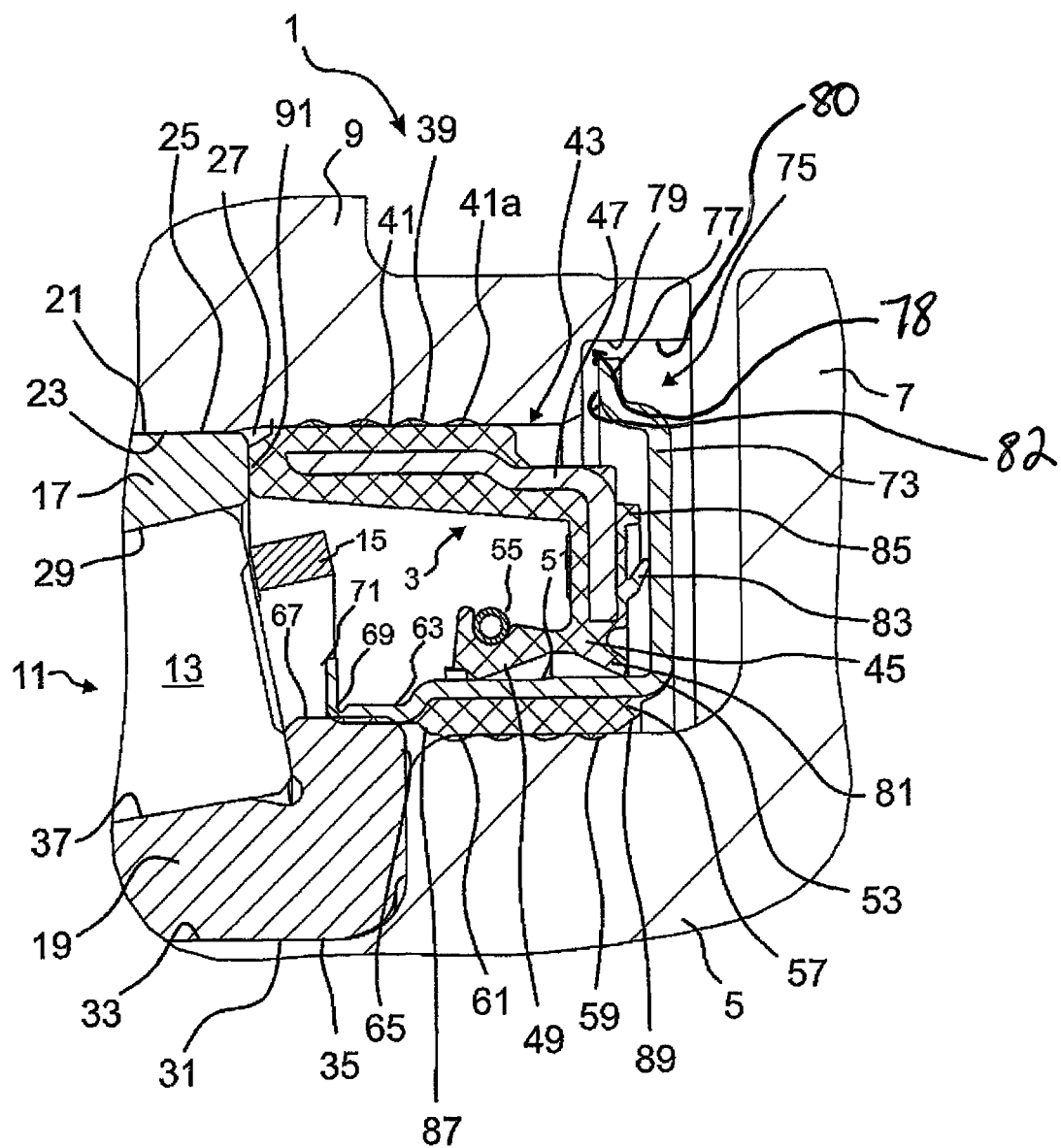
FIG. 2 is a cross-sectional side view of another illustrative embodiment of one inventive bearing assembly comprising an inventive sealing device.

Referring to FIGS. 1 and 2, a bearing assembly 1 includes a radial shaft seal 3 is disposed about a spindle 5 extending from a machine 7. The radial shaft seal 3 is disposed between the spindle 5 and a hub 9, which are pivotally connected by a roller bearing 11, such that the hub 9 is coaxially mounted on the spindle 5. Preferably, the spindle 5 is fixed stationary to the machine 7 and the hub 9 is rotatable or reciprocateable about the spindle 5, although alternatively, the hub 9 may be fixed stationary to the machine 7 and the spindle 5 may rotate or reciprocate within the hub 9.

The spindle 5 may be formed as any kind of shaft, rod or other known mechanical device which may be assembled with a bearing and a surrounding hub to form a pivot-mounted rotating or reciprocating arrangement. In this exemplary embodiment, the spindle 5 is a stationary fixed wheel axle of a truck and the hub 9 is a wheel-hub to which a running truck-wheel is connected.

The rolling bearing 11 may be any kind of known roller bearing including single or multiple row ball bearings, single or multiple row cylindrical roller bearings, tapered roller bearings, needle roller bearings, spherical roller bearings or their combinations in any kind of contact type and arrangement. In the exemplary embodiment shown, the rolling bearing 11 is a taper roller bearing comprising multiple tapered rollers 13, a spacer or cage 15, and an outer ring 17 and an inner ring 19.

The outer ring 17 has an outside diameter 21 sized to mate with an inside diameter 23 of a corresponding first seat 25 within a hub bore 27 of the hub 9. On the opposite side of the outside diameter 21, the outer ring 17 also includes an outer raceway 29. The inner ring 19 comprises an inside diameter 31 sized to mate with an outside diameter 33 of a corresponding first seat 35 of the spindle 5. On the opposite side of the inside diameter 31, the inner ring 19 also includes an inner raceway 37.

Co-axially arranged in the hub bore 27, the hub 9 comprises a second seat 39 for an outer static sealing surface 41 of the radial shaft seal 3. The outer static sealing surface 41 may comprise, as shown in the FIG. 1 of the exemplary embodiment, outer diameter beads 41a in order to accomplish a tight static seat of the radial shaft seal 3 in the second seat 39 of the hub bore 27.

For the exemplary embodiment, the radial shaft seal 3 comprises a shell portion 43 and a hinge portion 45. The shell portion 43 may consist of a single metal shell. However, as shown in FIGS. 1 and 2, the shell portion 43 preferably includes a metal reinforcement part 47 covered by an elastomeric or rubber material. The hinge portion 45 includes of an elastomeric or rubber material, and comprises a radial sealing lip 49. The hinge portion 45 together with the radial sealing lip 49 may be bonded to the shell portion 43, which may consist of a single metal shell, or formed as a single part together with the elastomeric or rubber covered shell portion 43, as shown in the drawing figures.

Preferably, the radial sealing lip 49 is in a circumferential contact with a running surface 51 of a sleeve member 53. The radial sealing lip 49 is tightly held in contact with the running surface 51 of the sleeve member 53 by a garter spring 55. The sleeve member 53 is positioned between the radial shaft seal 3 and the spindle 5. The sleeve member 53 comprises, at an inner circumference, an inner static sealing surface 57. The inner static sealing surface 57 may comprise, as shown in the Fig. of the exemplary embodiment, inner diameter beads 59 on order to accomplish a relative tight static seat of the sleeve member 53 at a second seat 61 of the spindle 5. The inner static sealing surface 57 is provided at an inner surface of a middle section of the sleeve member 53 which coaxially surrounds the spindle 5 at the second seat 61. At the sleeve member 53, a sleeve portion 63 extends in the axial direction from the middle section 54 of the sleeve member 53 towards the inner ring 19 of the rolling bearing 11. The sleeve portion 63 extends axially beyond a side surface 65 of the inner ring 19 and is disposeable about the bearing inner ring 19 so as to surround a shoulder diameter 67 of the ring 19. The inner diameter of the sleeve portion 63 is sized to the outer diameter of the shoulder diameter 67 in order to provide a rigid press fit connection of the sleeve member 53 with the spindle 5.

Preferably, the sleeve portion 63 includes a rim portion 69 disposeable on the bearing inner ring and a curl portion 71 extending generally radially outwardly from the sleeve member rim portion 69. More specifically, the curl portion 71 first extends from the rim portion 69 in the axial direction and is then deflected in the radial direction in order to provide a shoulder part of the sleeve member 53. The curl portion 71 has an outer diameter greater than the inner diameter of the radial sealing lip 49. Facing away from the curl portion 71, the sleeve member 53 includes an annular washer portion 73 which extends radially outwardly from the middle section of the sleeve member 53 to an outer diameter which exceeds the outer diameter of the radial shaft seal 3. An end portion 75 near the circumferential edge 77 of the annular washer portion 73 is disposeable at least generally adjacent to the hub 9 so as to form a gap seal with the hub 9. Preferably, the end portion 75 is stepped so as to provide or form a labyrinth seal (also referred to as a labyrinth seal portion 78 as shown in FIG. 2) in connection with a corresponding step 79 of the hub bore 27 of the hub 9 which forms sealing surface 80. The stepped portion 75 results in the end portion of the annular washer seal 73 forming a labyrinth sealing surface 82.

A radial dust lip 81 may be provided at the radial shaft seal 3. The radial dust lip 81, as shown in the Fig. of the exemplary embodiment, is in a circumferential contact with the running surface 51 of the sleeve member 53. An axial dust lip 83 may be provided at the radial shaft seal 3. The axial dust lip 83, as shown in the Fig. of the exemplary embodiment, is in circumferential contact with the annular washer portion 73 of the sleeve member 53. A further gap seal 85 may be provided near the axial dust lip 83.

Referring to FIG. 2, another embodiment of the bearing assembly 1 is shown that substantially similar to the embodiment depicted in FIG. 1, but with the following differences. As shown in FIG. 2, the radial shaft seal 3 includes a stop end 91 at a side face of the shell portion 43, in order to abut on the outer ring 17 side face in a mounting position. The sleeve member 53 comprises a tapered passage 89 to enable an alignment of the sleeve member 53 relative to the spindle 5 while mounting the sleeve member 53 on the spindle 5. The sleeve member 53 comprises an inner radial step 87 in order to restrict the maximum width of an axial overlap of the sleeve portion 63 and the inner ring 19 of the rolling bearing 11.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

LIST OF ELEMENTS 1 bearing assembly
3 radial shaft seal
5 spindle
7 machine
9 hub
11 rolling bearing
13 rollers
15 cage
17 outer ring
19 inner ring
21 outside diameter
23 inside diameter
25 first seat of hub bore
27 hub bore
29 outer raceway
31 inside diameter
33 outside diameter
35 first seat of spindle
37 inner raceway
39 second seat of hub bore
41 outer static sealing surface
43 shell portion
45 hinge portion
47 reinforcement part
49 radial sealing lip
51 running surface
53 sleeve member
54 middle portion of the sleeve member
55 garter spring
57 inner static sealing surface
59 inner diameter beads
61 second seat of spindle
63 sleeve portion
65 side surface
67 shoulder diameter
69 rim portion
71 curl portion
73 annular washer portion
75 end portion
77 circumferential edge
78 stepped labyrinth sealing portion
79 step
80 sealing surface
81 radial dust lip
82 labyrinth sealing surface
83 axial dust lip
85 gap seal
87 inner radial step
89 tapered passage
91 stop end

We claim:

1. A bearing assembly having a sealing device for sealing a space between a hub and a spindle pivotally connected by a bearing, the hub being coaxially mounted on the spindle and extending in an axial direction and the bearing having an inner ring and an outer ring, the bearing assembly comprising:

a radial shaft seal including a shell portion having an outer static sealing surface disposeable against the hub and a hinge portion having a radial sealing lip; and a sleeve member including an inner static sealing surface disposeable against the spindle, the sleeve member forming a running surface contactable by the radial sealing lip of the radial shaft seal, the sleeve member comprising a sleeve portion extending in the axial direction beyond a side surface of the inner ring of the bearing and disposeable about a shoulder diameter of the inner ring of the bearing, wherein the radial shaft seal is configured to extend between the hub and the running surface of the sleeve member, the radial shaft seal is not connected to the outer ring of the bearing and the radial shaft seal does not contact the inner ring of the bearing, the outer static sealing surface of the radial shaft seal being located on the hub and the sealing lip of the radial shaft seal being located on the running surface of the sleeve member.

2. The bearing assembly as recited in claim 1, wherein the sleeve portion has an inner diameter corresponding to the shoulder diameter of the bearing inner ring such that the sleeve member is engageable in a press fit with the inner ring of the bearing.

3. The bearing assembly as recited in claim 1, wherein the sleeve member includes an inner radial step configured to limit axial overlap of the sleeve portion and the bearing inner ring to predetermined maximum width.

4. The bearing assembly as recited in claim 1, wherein the sleeve member includes a tapered passage configured to enable alignment of the sleeve member relative to the spindle during mounting of the sleeve member onto the spindle.

5. The bearing assembly as recited in claim 1, wherein the sleeve member includes a rim disposeable on the bearing inner ring and a curl portion extending radially outwardly from the sleeve member rim.

6. The bearing assembly as recited in claim 5, wherein the curl portion has an outer diameter greater than an inner diameter of the radial sealing lip of the radial shaft seal.

7. The bearing assembly as recited in claim 1, wherein the sleeve member includes an annular washer portion extending radially outwardly from a middle portion of the sleeve and disposable adjacent to the hub so as to form a gap seal with the hub.

8. The bearing assembly as recited in claim 7, wherein the sleeve annular washer portion is stepped so as to provide a labyrinth seal with the hub.

9. The bearing assembly as recited in claim 1, wherein the radial shaft seal includes a stop end located at a side face of the shell portion and configured to abut against the outer ring side face when disposed in a mounting position.

10. A bearing assembly comprising:
a rolling bearing including an outer ring and an inner ring;
a radial shaft seal including a shell portion having an outer static sealing surface and a hinge portion having a radial sealing lip;
a hub with a bore including a first seat for the outer ring of the rolling bearing and a second seat for the outer static sealing surface of the radial shaft seal;
a sleeve member including an inner static sealing surface and a running surface configured to abut the radial sealing lip; and
a spindle including a first seat for the inner ring of the rolling bearing and a second seat for the inner static sealing surface of the sleeve member and extending in an axial direction coaxially with the hub;
wherein the bearing is mounted on the first seat of the spindle and the sleeve member is mounted on the second seat of the spindle and includes a sleeve portion extending in the axial direction beyond a side surface and disposed about a shoulder diameter of the bearing inner ring, wherein the radial shaft seal is configured to extend between the hub and the running surface of the sleeve member, the radial shaft seal does not contact the inner ring of the bearing, the outer static sealing surface of the radial shaft seal being located on the hub and the sealing lip of the radial shaft seal being located on the running surface of the sleeve member.

11. The bearing assembly as recited in claim 10, wherein the sleeve portion is engaged in a press fit with the bearing inner ring.

12. The bearing assembly as recited claim 10, wherein the sleeve member includes a rim disposeable on the bearing inner ring and a curl portion extending radially outwardly from the sleeve member rim.

13. The bearing assembly as recited in claim 12, wherein the curl portion has an outer diameter extending radially outwardly beyond a diameter of the radial sealing lip of the radial shaft seal.

14. The bearing assembly as recited in claim 10, wherein the sleeve member includes an annular washer portion extending radially outwardly from a middle portion of the sleeve and disposeable adjacent to the hub so as to form a gap seal with the hub.

15. The bearing assembly as recited in claim 14, wherein the sleeve annular washer portion is stepped so as to provide a labyrinth seal with the hub.

16. The bearing assembly as recited in claim 15, wherein the hub includes a stepped portion extending parallel to and spaced a distance from a stepped portion of the annular washer portion of the sleeve member to facilitate reduction of contamination entering the bearing assembly without using additional lip contacts.

17. The bearing assembly as recited in claim 16, wherein the sealing surface of the stepped labyrinth sealing portion of the hub and the labyrinth sealing surface of the annular washer portion of the sleeve member form an axial gap and a radial gap of the labyrinth seal.

* * * * *